June 26, 1951  T. R. CHAMBERS  2,558,538
STREET LOCATING DEVICE
Filed Feb. 26, 1947  2 Sheets—Sheet 1
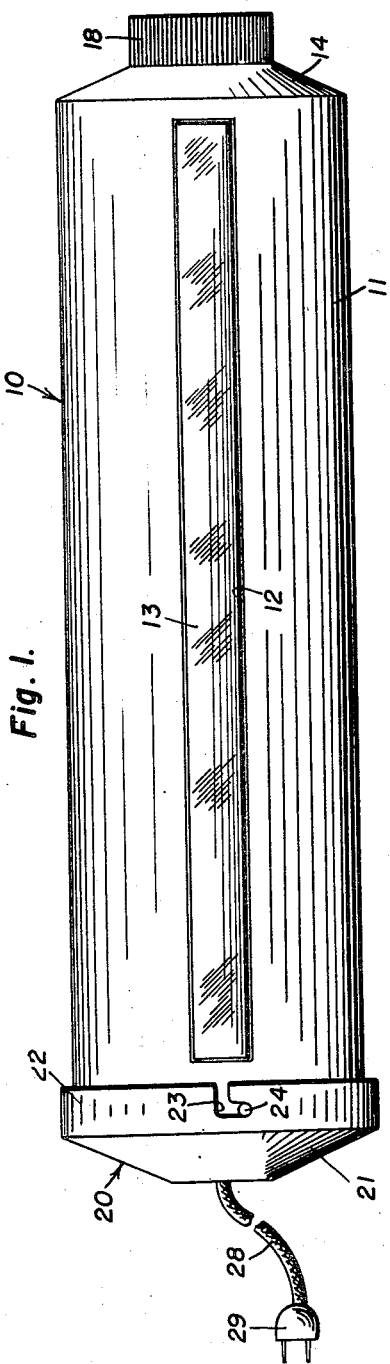
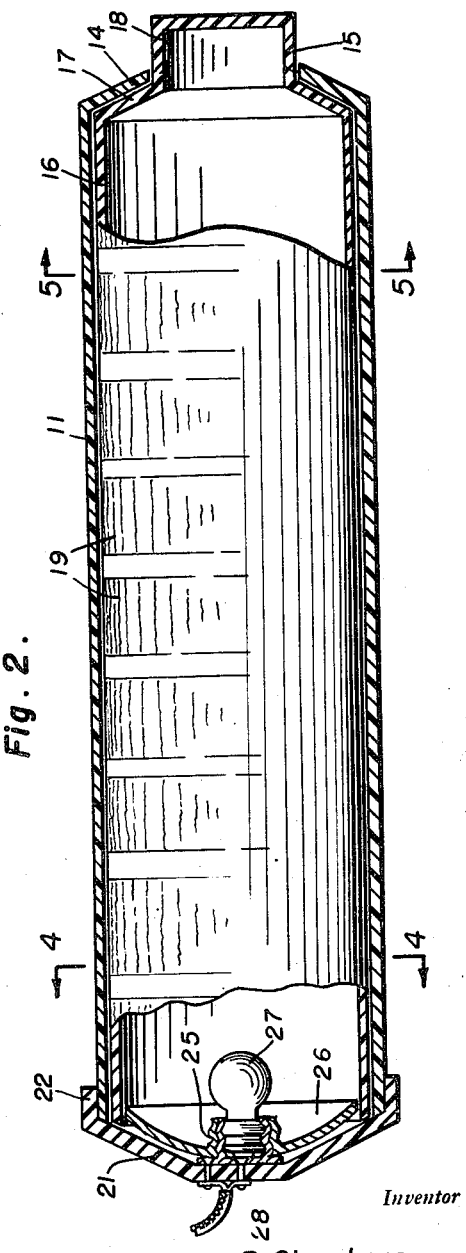
Inventor
Thomas R. Chambers
By Clarence A. O'Brien
and Harvey B. Jacobson
Attorneys June 26, 1951   T. R. CHAMBERS   2,558,538
STREET LOCATING DEVICE
Filed Feb. 26, 1947   2 Sheets-Sheet 2
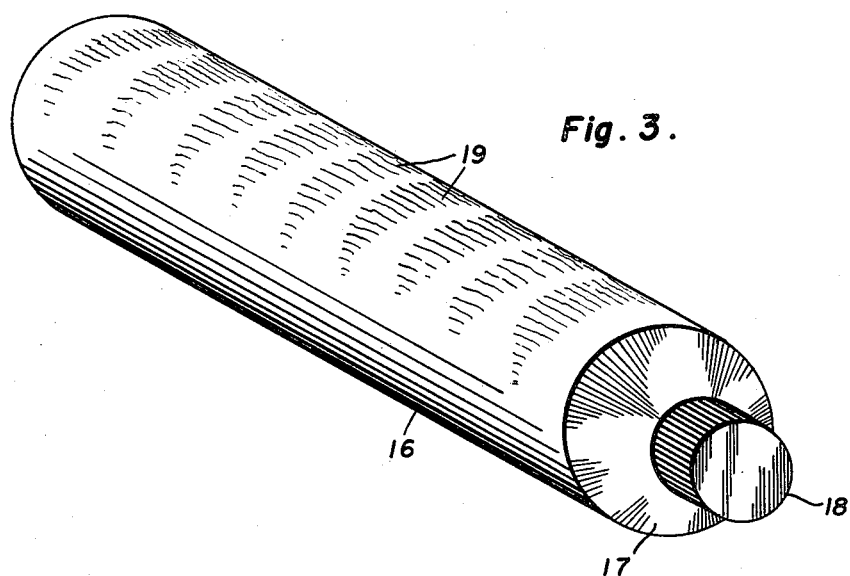
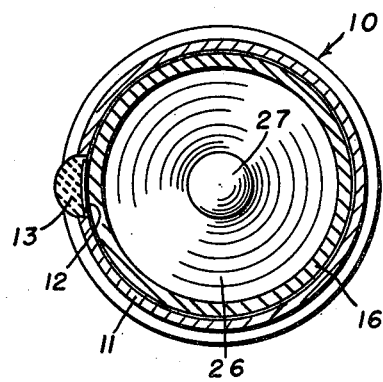
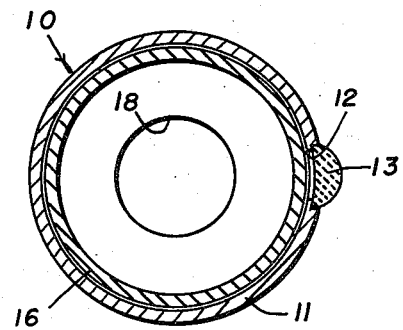
*Inventor*
Thomas R. Chambers
By Clarence A. O'Brien
and Harvey B. Jacobson
*Attorneys*

Patented June 26, 1951

2,558,538

UNITED STATES PATENT OFFICE 2,558,538

STREET LOCATING DEVICE

Thomas R. Chambers, Chicago, Ill.

Application February 26, 1947, Serial No. 731,079

4 Claims. (Cl. 40—77)

This invention relates to a directograph or street locating device and has for its primary object to enable a person easily and quickly to locate the various streets of a city or town.

Another object is to enable the directions to be read both in daylight and after dark.

A further object is to give the directions for finding a vast number of streets and yet render the directions easily read.

The above and other objects may be attained by employing this invention which embodies, among its features, a tubular body having an elongated window extending longitudinally through its side, an end wall closing one end of the body, said end wall having an axial opening therein, a cap closing the opposite end of the body, a cylinder rotatable within the body, indices on the cylinder adapted to be viewed through the window, and a knob on the cylinder adapted to protrude through the axial opening whereby the cylinder may be rotated relative to the body.

Other features include a magnifying glass covering the window so that the smallest type carried on the cylinder may be easily read through the window and means within the body for illuminating the cylinder to permit the indices easily to be read after darkness.

In the drawings,

Figure 1 is a side view of a directograph or street-locating device embodying the features of this invention.

Figure 2 is a longitudinal sectional view through the instrument illustrated in Figure 1, certain portions being shown in elevation, Figure 3 is a perspective view of the cylinder bearing the indices, Figure 4 is a transverse sectional view taken substantially along the line 4—4 of Figure 2, and Figure 5 is a transverse sectional view taken substantially along the line 5—5 of Figure 2.

Referring to the drawings in detail, this improved directograph designated generally 10 comprises a tubular body 11 preferably formed of an opaque plastic composition. This body 11 is provided in its side with an elongated, longitudinally extending window 12, and this window is preferably closed by a convex cover glass 13 which is adapted to magnify the indices carried on the cylinder to be more fully hereinafter described. One end of the tubular body 11 is wholly open, while the opposite end is provided with a frusto-conical end wall 14 formed with an axial opening 15, the purpose of which will be more fully hereinafter explained.

Fitted within the tubular body 11 is a rotary cylinder 16 provided, at one end, with a frusto-conical end wall 17 having an axial knob or cylindrical extension 18 of a diameter readily to fit within the opening 15 so as to form a bearing for supporting the inner end of the cylinder 16 for rotation within the body 11. Formed on the periphery of the cylinder 16 are indices 19 which are adapted to be viewed through the window 12 as the cylinder is rotated within the tubular body 11 by means of the knob 18. The cylinder 16 is preferably formed of a transparent or translucent plastic composition with the indices 19 etched or engraved thereon in a contrasting color which will render them readily visible through the window.

A cap designated generally 20 is adapted to close the end of the tubular body 11 opposite the wall 14, and this cap comprises a substantially frusto-conical body 21 provided at its periphery with a flange 22 which, as illustrated, embraces the tubular body 11 adjacent its open end. This flange 22 is provided, at spaced intervals, with bayonet slots 23 which are adapted to receive pins 24 which radiate from the tubular body 11 adjacent its open end in order detachably to couple the cap 20 with the body.

Riveted or otherwise attached to the inner face of the cap 20 is a lamp socket 25, and surrounding the lamp socket and extending concentrically therewith is a concave reflector 26. A lamp bulb 27 is supported by the socket 25 and certain of the light rays therefrom are directed by the reflector 26 longitudinally of the tubular body 11 within the cylinder 16. The socket 25 is coupled in a conventional manner to a conventional conductor cable 28 which may be equipped with a conventional coupling plug 29, or connected in any suitable manner to a source of power by which the lamp 27 may be illuminated.

In the preferred embodiment of the invention, the tubular body 11 is formed of an opaque plastic, preferably black in color, and the cap 20 likewise is formed of a similar plastic composition. The rotary cylinder 16, on the other hand, is preferably formed of a yellow plastic composition which will be more or less translucent or transparent, with the indices 19 etched or otherwise produced on the surface of the cylinder 16 in a contrasting color. With the parts assembled as illustrated in the drawings, it will be evident that upon rotating the knob 18 various different indices 19 may be brought beneath the window 12 to be viewed therethrough and by employing the convex lens 13 in the window, a vast number of indices may be produced on the surface of the cylinder 16 and yet may easily be visible through the window. Due to the detachability of the cap 20, it is obvious that the cylinder 16 may easily and quickly be extracted from the tubular body 11 and another cylinder substituted therefor, so that a different set of indices may be easily and quickly installed in the tubular body without in any way altering the construction thereof. Should it be desired to employ the device after dark, it is but a simple matter to plug in the plug 29 to a convenient outlet, or couple the conductor 28 to any suitable source of power which will illuminate the lamp 27. The light rays emanating from the lamp will illuminate the cylinder 16 throughout its entire length, particularly in view of the effect of the reflector 26.

While in the foregoing there has been shown and described the preferred embodiment of this invention, it is to be understood that minor changes in the details of construction, combination and arrangement of parts may be resorted to without departing from the spirit and scope of the invention as claimed.

What I claim is:

1. A street locating device comprising a tubular body wholly open at one end, said body having an elongated window extending longitudinally through its side, an end wall closing the end of the body opposite its open end, said end wall having an axial opening therein, a cylinder adapted to be entered into the body through its open end, a circular cylindrical knob on the end of the cylinder opposite the open end of the body for protrusion through the axial opening, said knob forming a trunnion on which the cylinder rotates, indices on the cylinder visible through the window, and a detachable cap slidably fitted on the body adjacent its open end to hold the cylinder in place in the body, a lamp socket carried on the inside face of the cap in axial alignment with the cylinder, a reflector carried by the cap for directing light rays longitudinally along the cylinder, the periphery of the reflector entering the cylinder and cooperating with the knob in supporting the cylinder for rotation within the body and a lamp in said socket.

2. A street locating device comprising an outer cylinder and an inner cylinder, said outer cylinder having a longitudinally extending slot therein, indicia carried by said inner cylinder, first and second ends on each of said cylinders, means rotatably supporting said first end of said inner cylinder on said outer cylinder, a cap for said second end of said outer cylinder, a peripheral flange on said cap, said second end of said outer cylinder being received in said flange, means detachably locking said cap to said outer cylinder, a lamp socket attached to said cap, a reflector mounted on said lamp socket and having a peripheral rim, said reflector extending into said second end of said inner cylinder and rotatably supporting said inner cylinder, said second end of said inner cylinder abutting said cap to thereby limit axial movement of said inner cylinder relative to said outer cylinder axially of said outer cylinder.

3. A street locating device comprising an outer cylinder and an inner cylinder disposed in said outer cylinder, said outer cylinder having an inwardly extending flange on a first end thereof, the inner edge of said flange defining a bore which is axial of said outer cylinder, an end wall on a first end of said inner cylinder, and an axial cylindrical knob on said end wall, said knob being rotatably supported by said flange on said outer cylinder, a cap detachably mounted on the second end of said outer cylinder, a reflector attached to said cap, said reflector extending into the second end of said inner cylinder and rotatably supporting said inner cylinder, a light attached to said cap, said outer cylinder having a longitudinally extending slot therein, and indicia carried by said inner cylinder.

4. A street locating device comprising an outer cylinder and an inner cylinder disposed in said outer cylinder, said outer cylinder having a longitudinally extending slot therein, indicia carried by said inner cylinder and adapted to be registered with said slot, first and second ends on each of said cylinders, said first end of said outer cylinder having an inwardly extending flange thereon, the inner edge of said flange providing an annular bearing surface which is disposed axially of said outer cylinder, an inwardly extending rim on said first end of said inner cylinder complementary to said flange on said outer cylinder, a hollow cylindrical knob formed integrally with said rim, an end wall on said knob, said knob being rotatably received on said annular bearing surface of said flange, a cap for said second end of said outer cylinder, a peripheral flange on said cap, said second end of said outer cylinder being received in said flange, means detachably locking said cap to said outer cylinder, a light attached to said cap, a reflector attached to said cap and having a peripheral rim, said reflector extending into said second end of said inner cylinder, said rim on said reflector rotatably supporting said inner cylinder axially of said outer cylinder.

THOMAS R. CHAMBERS.

REFERENCES CITED

The following references are of record in the file of this patent:

UNITED STATES PATENTS

| Number | Name | Date |
|---|---|---|
| 632,649 | Goldborg | Sept. 5, 1899 |
| 819,394 | Williams | May 1, 1906 |
| 1,059,546 | Lawrence | Apr. 22, 1913 |
| 1,782,065 | Gwynn | Nov. 18, 1930 |

FOREIGN PATENTS

| Number | Country | Date |
|---|---|---|
| 21,778 of 1935 | Australia | June 15, 1936 |